United States Patent
Rayankula et al.

(10) Patent No.: US 12,219,226 B2
(45) Date of Patent: Feb. 4, 2025

(54) SHARED APERTURE IMAGING SYSTEM FOR ACQUIRING VISIBLE AND INFRARED IMAGES

(71) Applicant: Apple Inc., Cupertino, CA (US)

(72) Inventors: Aditya Rayankula, Cupertino, CA (US); Xiangli Li, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 17/948,054

(22) Filed: Sep. 19, 2022

(65) Prior Publication Data

US 2024/0107136 A1    Mar. 28, 2024

(51) Int. Cl.
| | |
|---|---|
| *H04N 23/45* | (2023.01) |
| *G02B 5/20* | (2006.01) |
| *G02B 27/14* | (2006.01) |
| *H04N 23/50* | (2023.01) |
| *H04N 23/56* | (2023.01) |

(52) U.S. Cl.
CPC ........... *H04N 23/45* (2023.01); *G02B 27/149* (2013.01); *H04N 23/50* (2023.01); *H04N 23/56* (2023.01); *G02B 5/208* (2013.01)

(58) Field of Classification Search
CPC ........ H04N 23/45; H04N 23/50; H04N 23/56; G02B 27/149; G02B 5/208
See application file for complete search history.

(56) References Cited

U.S. PATENT DOCUMENTS

| | | | |
|---|---|---|---|
| 5,761,543 A | * | 6/1998 | Yamada ................. G03B 13/02 396/51 |
| 6,477,326 B1 | * | 11/2002 | Partynski ................. G02B 7/18 396/7 |
| 6,593,558 B1 | | 7/2003 | Edgar |
| 7,490,779 B2 | | 2/2009 | Shinozaki |
| 7,934,836 B2 | | 5/2011 | Ito |
| 8,259,203 B2 | | 9/2012 | Baldwin |
| 8,355,042 B2 | | 1/2013 | Lablans |
| 8,553,106 B2 | | 10/2013 | Scarff |
| 8,737,830 B2 | | 5/2014 | Cheng et al. |

(Continued)

OTHER PUBLICATIONS

U.S. Appl. No. 17/950,927, filed Sep. 22, 2022, Williams et al.
U.S. Appl. No. 18/101,950, filed Jan. 26, 2023, Alaimo et al.
U.S. Appl. No. 18/205,380, filed Jun. 2, 2023, Birnbaum.

*Primary Examiner* — Chiawei Chen
(74) *Attorney, Agent, or Firm* — Brownstein Hyatt Farber Schreck, LLP

(57) ABSTRACT

An electronic device includes a housing including a front cover opposite a back cover; a display viewable through the front cover; a light-bending mirror positioned between the front cover and the back cover and receiving light through one of the front cover or the back cover, the light-bending mirror redirecting received light along a light path parallel to the front cover and the back cover; a dichroic cube prism positioned in the light path, the dichroic cube prism receiving light through a first face of the dichroic cube prism, redirecting a visible light portion of the received light through a second face of the dichroic cube prism, and redirecting an infrared (IR) portion of the received light through a third face of the dichroic cube prism; a visible light image sensor positioned adjacent the second face; and an IR light image sensor positioned adjacent the third face.

19 Claims, 10 Drawing Sheets

(56) References Cited

U.S. PATENT DOCUMENTS

| | | | |
|---|---|---|---|
| 8,804,111 B2* | 8/2014 | Golovanevsky | G01N 21/9501 356/326 |
| 8,988,564 B2* | 3/2015 | Webster | H04N 23/54 348/265 |
| 9,632,279 B2 | 4/2017 | Chen | |
| 9,686,531 B2 | 6/2017 | Ko et al. | |
| 10,257,433 B2 | 4/2019 | Eromäki | |
| 10,264,188 B2 | 4/2019 | Miller et al. | |
| 10,779,734 B2 | 9/2020 | Fengler et al. | |
| 11,328,150 B2 | 5/2022 | Fan | |
| 2004/0070829 A1* | 4/2004 | Kurtz | H01Q 15/24 359/485.05 |
| 2005/0051728 A1 | 3/2005 | Miyauchi | |
| 2009/0303317 A1* | 12/2009 | Tesar | H04N 5/33 348/E7.085 |
| 2010/0033813 A1 | 2/2010 | Rogoff | |
| 2010/0053332 A1* | 3/2010 | Massie | G02B 26/0866 348/E5.09 |
| 2010/0079587 A1* | 4/2010 | Yoshida | A61B 5/0071 348/68 |
| 2011/0190639 A1* | 8/2011 | Peltie | A61B 5/0059 600/476 |
| 2013/0063629 A1* | 3/2013 | Webster | G02B 27/149 348/265 |
| 2013/0141541 A1 | 6/2013 | Jung et al. | |
| 2013/0242057 A1 | 9/2013 | Hong et al. | |
| 2014/0066781 A1* | 3/2014 | Park | A61B 1/00009 600/475 |
| 2015/0177524 A1* | 6/2015 | Webster | H04N 23/60 348/360 |
| 2016/0022181 A1* | 1/2016 | Valsan | A61B 5/0261 600/323 |
| 2017/0020377 A1 | 1/2017 | Takeuchi et al. | |
| 2017/0352139 A1* | 12/2017 | Mrdjen | G02B 27/1013 |
| 2018/0054610 A1* | 2/2018 | Shpunt | G02B 26/0816 |
| 2018/0132706 A1* | 5/2018 | Nagae | A61B 1/00006 |
| 2021/0052149 A1* | 2/2021 | Fukumoto | A61B 1/046 |
| 2021/0168269 A1* | 6/2021 | Wheatley | H04N 23/16 |
| 2021/0185197 A1* | 6/2021 | Attar | G02B 26/105 |
| 2021/0278684 A1* | 9/2021 | Garan | G02B 27/283 |
| 2021/0302589 A1* | 9/2021 | Takeuchi | G01S 17/894 |
| 2021/0329153 A1* | 10/2021 | Kiniwa | H04N 23/55 |
| 2022/0030173 A1 | 1/2022 | Noh et al. | |
| 2023/0418069 A1* | 12/2023 | Amitai | G02B 27/0179 |

* cited by examiner

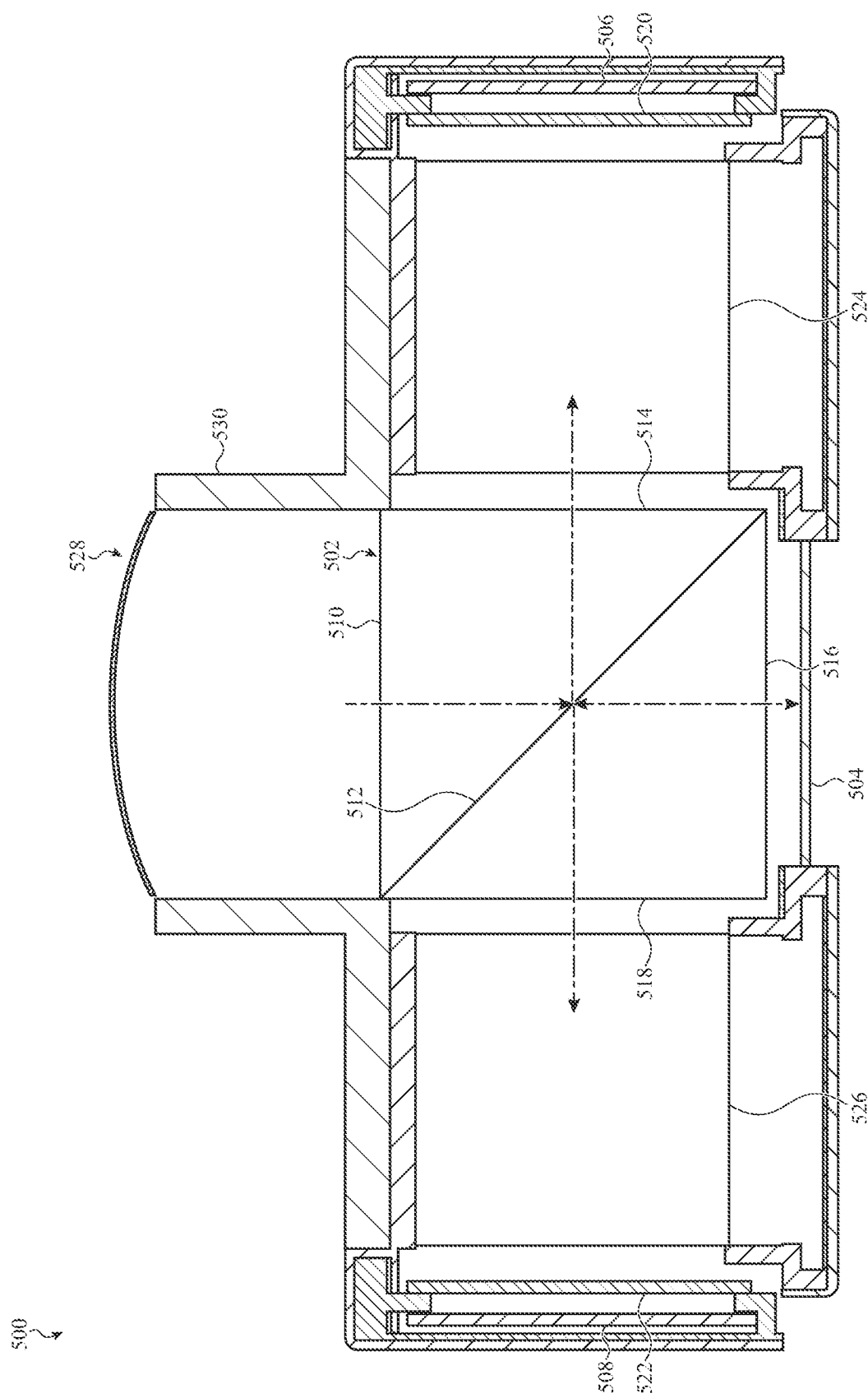

SHARED APERTURE IMAGING SYSTEM FOR ACQUIRING VISIBLE AND INFRARED IMAGES

FIELD

The described embodiments generally relate to image sensors and, more particularly, to sensing different types of images (e.g., visible light images and infrared (IR) light images) using a single camera module.

BACKGROUND

Some electronic devices (e.g., mobile phones or tablet computers) may include both a visible image sensor (e.g., a red-green-blue (RGB) image sensor) and an IR image sensor (e.g., a depth sensor used for bio-authentication (e.g., face identification) or navigation). The visible image sensor and IR image sensor are often provided as components of two separate camera modules. One of the camera modules is optimized for visible light image acquisition, and one of the camera modules is optimized for IR light image acquisition. This usually requires a larger area adjacent a device's display to be dedicated for the apertures of the two camera modules, thereby limiting the device's display area and impacting a user's viewing experience. Two camera modules, each having a different focus, also limit how visible light and IR light images can be used in combination and/or make using the images in combination more difficult (e.g., because the images acquired by the different image sensors are not inherently aligned).

SUMMARY

Embodiments of the systems, devices, methods, and apparatus described in the present disclosure are directed to sensing different types of images (e.g., visible light images and IR light images) using a single camera module.

In a first aspect, the present disclosure describes an electronic device. The electronic device may include a housing and a display. The housing may include a front cover opposite a back cover, and the display may be viewable through the front cover. A light-bending mirror may be positioned between the front cover and the back cover and receive light through one of the front cover or the back cover. The light-bending mirror may redirect the received light along a light path parallel to the front cover and the back cover. A dichroic cube prism may be positioned in the light path. The dichroic cube prism may receive light through a first face of the dichroic cube prism, redirect a visible light portion of the received light through a second face of the dichroic cube prism, and redirect an IR portion of the received light through a third face of the dichroic cube prism. A visible light image sensor may be positioned to receive visible light exiting the second face of the dichroic cube prism, and an IR light image sensor may be positioned to receive IR light exiting the third face of the dichroic cube prism.

In a second aspect, the present disclosure describes another electronic device. The method may include a dichroic cube prism. The dichroic cube prism may receive light through a first face of the dichroic cube prism, redirect a visible light portion of the received light through a second face of the dichroic cube prism, and redirect an IR portion of the received light through a third face of the dichroic cube prism. A visible light image sensor may be positioned to receive visible light exiting the second face of the dichroic cube prism. A mirror may be positioned to reflect IR light exiting the third face of the dichroic cube prism back into the third face of the dichroic cube prism. The dichroic cube prism may redirect the reflected IR light through a fourth face of the dichroic cube prism. An IR light image sensor may be positioned to receive the IR light exiting the fourth face of the dichroic cube prism.

In a third aspect, the present disclosure describes an imaging system. The imaging system may include a dichroic cube prism. The dichroic cube prism may receive light through a first face of the dichroic cube prism, redirect a visible light portion of the received light through a second face of the dichroic cube prism, and redirect an IR portion of the received light through a third face of the dichroic cube prism. The dichroic cube prism may have an IR cut filter coating on the second face, and may have an IR bandpass filter coating on the third face. A visible light image sensor may be positioned to receive visible light exiting the second face of the dichroic cub prism and passing through the IR cut filter. An IR light image sensor may be positioned to receive IR light exiting the third face and passing through the IR bandpass filter.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIGS. 1-5 show different examples of imaging systems that include a dichroic cube prism;

Figure 1:
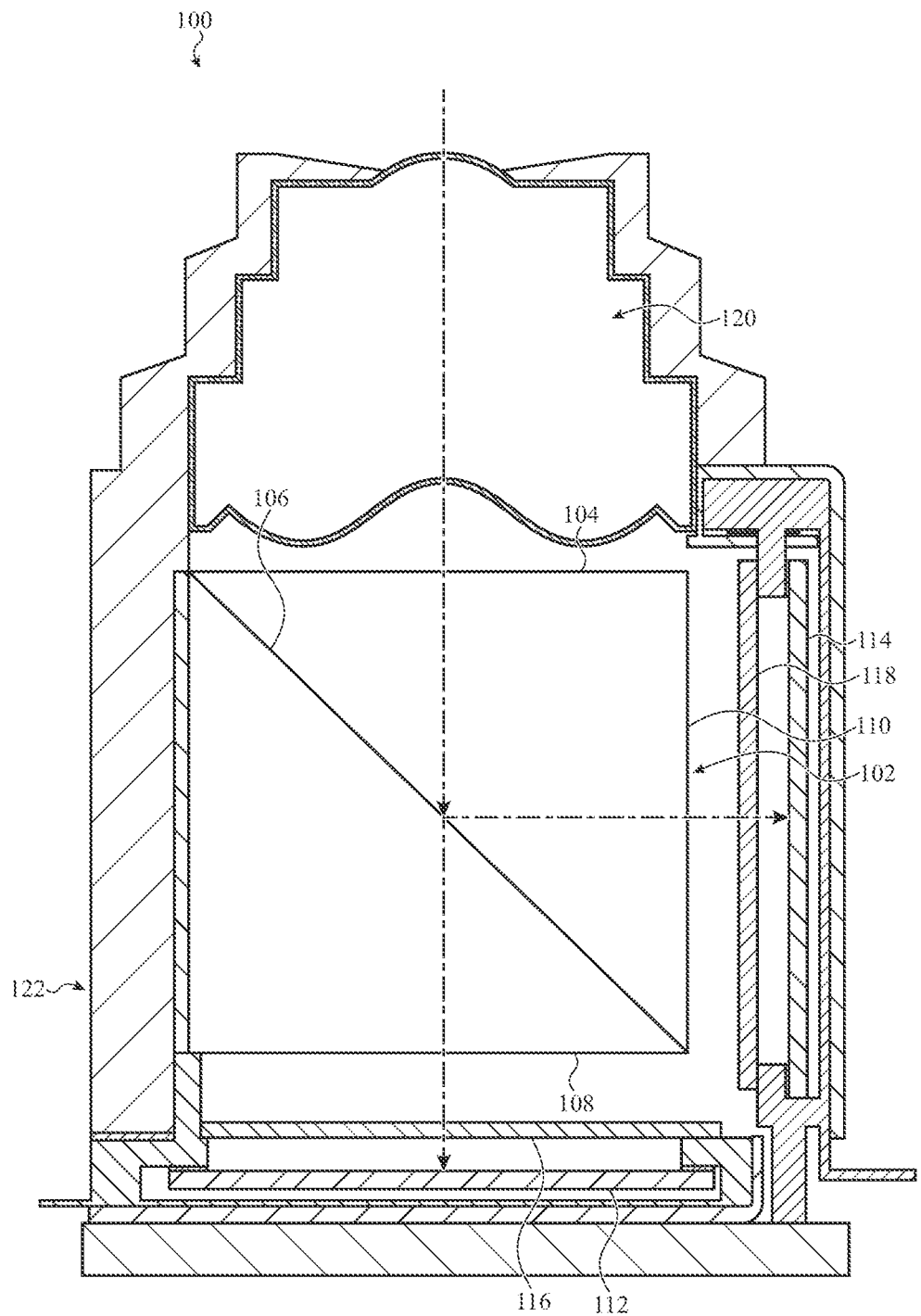

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments and appended claims.

A previously proposed solution for combining visible light and IR light image sensors in a single aperture camera module is to modify an RGB Bayer pattern mosaic of a visible light image sensor by replacing one of the green pixels of the RGB Bayer pattern mosaic with a pixel type having a high IR transmittance and a dual bandpass (visible and IR) filter instead of a standard IR cut filter. However, such a solution requires significantly more complex image processing algorithms, and various calibrations, to restore the image quality of the RGB image. Usually, several image quality trade-offs need to be made, and the RGB image acquired by such a camera module may be sub-standard compared to an RGB image acquired by a stand-alone RGB camera module.

Stacked RGB-IR image sensor solutions can reduce some of the image processing complexities, but IR light needs to be removed (e.g., calibrated out of) RGB image captures. Also, due to the differing refractive indices of lens element materials, chromatic defocus can be an issue for stacked RGB-IR image sensors. Chromatic defocus occurs when a single lens (or lens system) can only be focused on an RGB image sensor or an IR image sensor, but not both, because the RGB and IR image sensors are in different positions with respect to the single lens (or lens system). Chromatic defocus typically causes a reduction in the modulation transfer function (MTF) for IR imaging, as the focus position is typically optimized for RGB imaging. The result of a stacked RGB-IR image sensor solution is usually an RGB image with image quality trade-offs or artifacts, and an IR image with low sharpness and resolution.

Described herein are various implementations for a single aperture camera module. The implementations allow for simultaneous or sequential (i.e., synchronized) RGB and IR image acquisition. The described implementations use a dichroic cube prism, which for purposes of this description is a cube prism having a dichroic surface. The dichroic surface functions as a light splitter by reflecting (and redirecting) light within a first range of wavelengths, and passing light within a second range of wavelengths, such that the first and second ranges of wavelengths propagate along different orthogonal axes after they are split by the dichroic surface. The first and second ranges of wavelengths may be visible and IR wavelengths (or vice versa). The material(s) of the dichroic surface may be chosen such that the cutoff wavelengths are far enough away from the cutoff wavelengths of downstream filters (e.g., an IR cut filter or IR band pass filter) to avoid angular incident light dependencies. The dichroic cube prism may be formed by bonding two right angled triangular prisms, with one of the right angled triangular prisms having the dichroic surface thereon. Two image sensors—one optimized for visible light (e.g., RGB) imaging, and another optimized for IR light imaging—may be positioned in the respective light paths that are optically downstream from the dichroic cube prism. The RGB and IR image sensors can be separately placed or adjusted to mitigate chromatic defocus issues, so that the optimum MTF can be achieved for a given lens design in both cases.

These and other embodiments are described with reference to FIGS. 1-7. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

FIG. 1 shows a first example of an imaging system 100 that includes a dichroic cube prism 102. In some embodiments, the imaging system 100 may be included in a mobile phone, tablet computer, laptop computer, or wearable device (e.g., an electronic watch, health monitoring device, or activity/fitness monitoring device). In some embodiments, the imaging system 100 may be included in a navigation or machine vision system, vehicle, security monitor, appliance (e.g., a doorbell), or other type of electronic device. In some embodiments, the imaging system 100 may be included in the electronic device described with reference to FIGS. 6A-6D.

The dichroic cube prism 102 may receive light, from a field of view (FoV), on a first face 104 of the dichroic cube prism 102. After entering the dichroic cube prism 102 and interacting with a dichroic surface 106 of the dichroic cube prism 102 (e.g., one or more layers sandwiched between two triangular prisms that form the cube prism), a visible light portion of the received light may be redirected through a second face 108 of the dichroic cube prism 102, and an IR light portion of the received light may be redirected through a third face 110 of the dichroic cube prism 102.

Visible light exiting the second face 108 of the dichroic cube prism 102 may be received at a visible light image sensor 112 (e.g., an RGB image sensor). IR light exiting the third face 110 of the dichroic cube prism 102 may be received at an IR light image sensor 114. The visible light image sensor 112 may have a light-receiving surface oriented parallel to the second face 108 of the dichroic cube prism 102, and the IR light image sensor 114 may have a light-receiving surface oriented parallel to the third face 110 of the dichroic cube prism 102.

By way of example, the dichroic surface 106 is shown to bend IR light and pass visible light. In alternative embodiments, the dichroic surface 106 may bend visible light and pass IR light, and the positions of the visible light image sensor 112 and the IR light image sensor 114 may be swapped.

In some embodiments of the imaging system 100, an IR cut filter 116 may be positioned between the second face 108 of the dichroic cube prism 102 and the visible light image sensor 112, and/or an IR bandpass filter 118 may be positioned between the third face 110 of the dichroic cube prism 102 and the IR light image sensor 114. These filters 116, 118 may block stray light that passes through the dichroic surface 106 and/or further tune the range of wavelengths that are able to impinge on the visible light image sensor 112 and/or IR light image sensor 114.

In some embodiments, the imaging system 100 may include one or more lenses, filters, or other optical elements 120 positioned optically upstream from the first face 104 of the dichroic cube prism 102. The lenses, filters, or other optical elements 120 may focus, filter, or otherwise process both visible and IR light, and in some cases may expand the FoV of the imaging system 100. Optionally, one or more lenses, filters, or other optical elements may be positioned between the second face 108 of the dichroic cube prism 102 and the visible light image sensor 112 and be tuned for processing visible light, and/or one or more lenses, filters, or other optical elements may be positioned between the third face 110 of the dichroic cube prism 102 and the IR light image sensor 114 and be tuned for processing IR light.

An optional housing 122 may maintain the positions and orientations of the image sensor's components. Optionally, the visible light image sensor 112, IR light image sensor 114, or optical elements 120 may be movably mounted in relation to other components of the imaging system 100, which can enable features such as focus adjustment or image stabilization. With regard to focus adjustment, separate movement of one or both of the image sensors 112, 114 enables a common FoV to be separately focused on one or both of the image sensors 112, 114.

Figure 2:
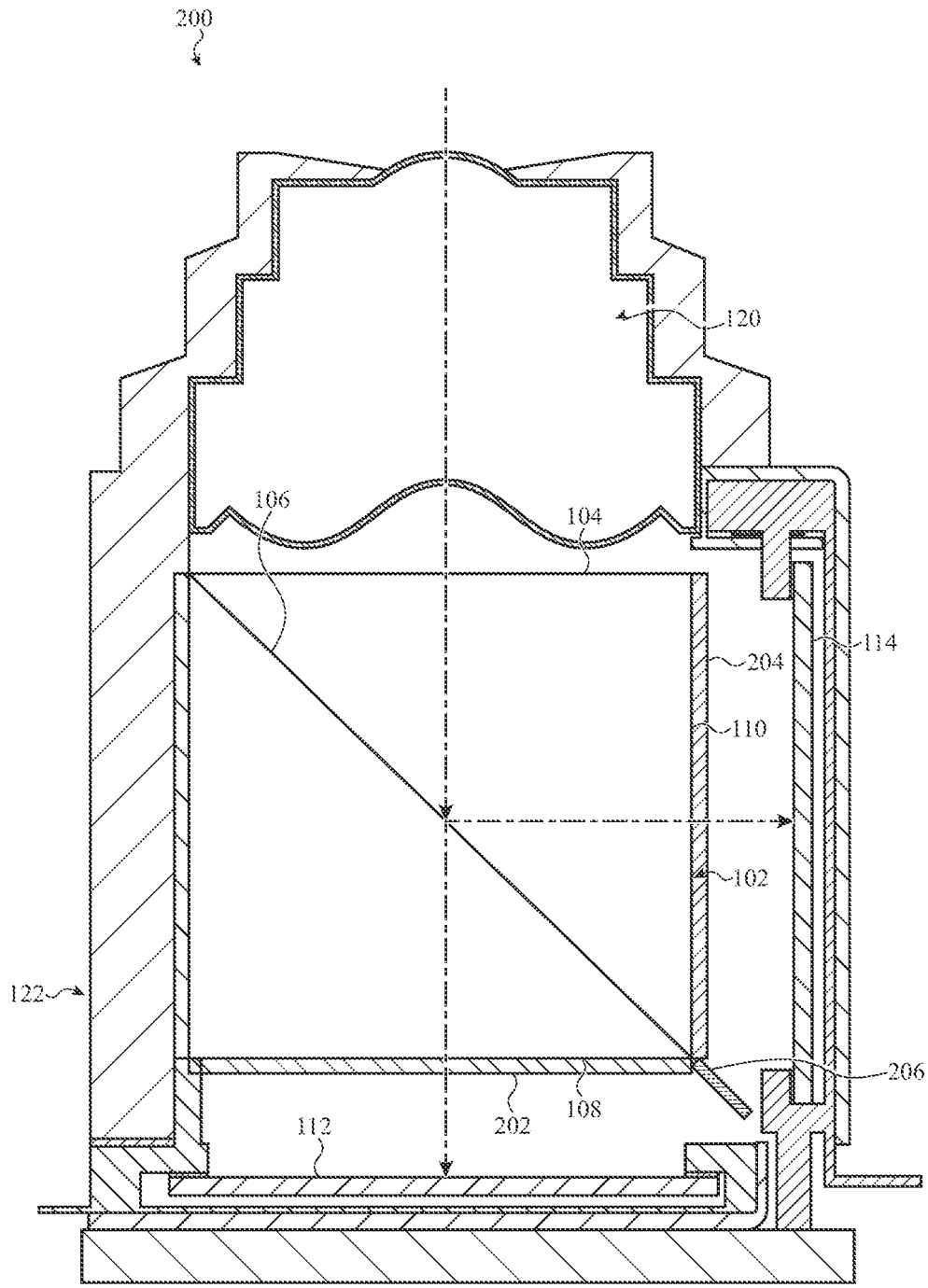

FIG. 2 shows a variant of the imaging system described with reference to FIG. 1. The imaging system 200 includes the same dichroic cube prism 102, visible light image sensor 112, IR light image sensor 114, optional optical element(s) 120, and optional housing 122 described with reference to FIG. 1. However, instead of a separate IR cut filter 116 and IR bandpass filter 118, the imaging system 200 includes an IR cut filter coating 202 on the second face 108 of the dichroic cube prism 102, and an IR bandpass filter coating 204 on the third face 110 of the dichroic cube prism 102.

Applying an IR cut filter coating 202 and/or IR bandpass filter coating 204 on the dichroic cube prism 102 reduces the number of parts that need to be separately manufactured and aligned, potentially saves costs, and potentially reduces the overall size of the imaging system 200 (e.g., in some embodiments, the visible light image sensor 112 and/or IR light image sensor 114 may be placed closer to the dichroic cube prism 102 as a result of eliminating the separate IR cut filter and IR bandpass filter.

In some embodiments, a light-blocking material 206 may extend from the dichroic cube prism 102 to between the visible light image sensor 112 and the IR light image sensor 114. The light-blocking material 206 may block at least visible and IR light (or a range of visible and IR light). In some embodiments, the light-blocking material 206 may include plastic or metal. In some embodiments, the light-blocking material 206 may absorb visible and/or IR light in addition to blocking visible and IR light.

Similarly to what is described with reference to FIG. 1, one or more lenses, filters, or other optical elements may be optionally positioned between the IR cut filter coating 202 and the visible light image sensor 112 and be tuned for processing visible light, and/or one or more lenses, filters, or other optical elements may be positioned between the IR bandpass filter coating 204 and the IR light image sensor 114 and be tuned for processing IR light.

Figure 3:
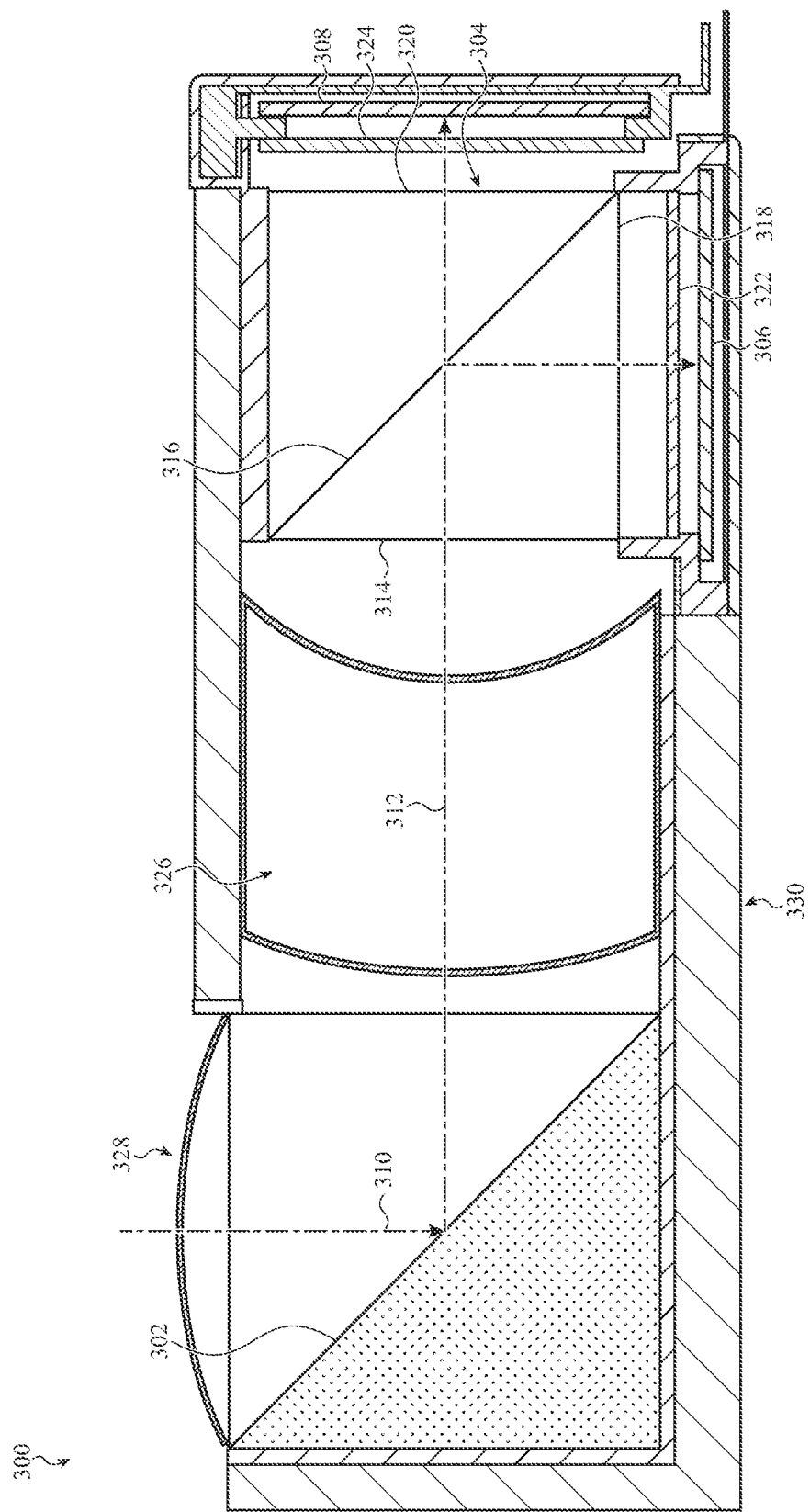

FIG. 3 shows a third example of an imaging system 300 that includes a dichroic cube prism 304. In some embodiments, the imaging system 300 may be included in a mobile phone, tablet computer, laptop computer, or wearable device (e.g., an electronic watch, health monitoring device, or activity/fitness monitoring device). In some embodiments, the imaging system 300 may be included in a navigation or machine vision system, vehicle, security monitor, appliance (e.g., a doorbell), or other type of electronic device. In some embodiments, the imaging system 300 may be included in the electronic device described with reference to FIGS. 6A-6D.

The imaging system 300 includes a light-bending mirror 302, a dichroic cube prism 304, a visible light image sensor 306, and an IR light image sensor 308. The light-bending mirror 302 may receive light, from a FoV, and redirect the light along a second light path 312 that is orthogonal to a first light path 310 along which the light is received at the mirror 302. The dichroic cube prism 304 may be positioned in the second light path 312. In some embodiments, the light-bending mirror 302 may be formed on a surface of a triangular prism, for ease of handling and positioning.

The dichroic cube prism 304 may receive light, from the second light path 312, on a first face 314 of the dichroic cube prism 304. After entering the dichroic cube prism 304 and interacting with a dichroic surface 316 of the dichroic cube prism 304 (e.g., one or more layers sandwiched between two triangular prisms that form the cube prism), a visible light portion of the received light may be redirected through a second face 318 of the dichroic cube prism 304, and an IR light portion of the received light may be redirected through a third face 320 of the dichroic cube prism 304.

Visible light exiting the second face 318 of the dichroic cube prism 304 may be received at the visible light image sensor 306 (e.g., an RGB image sensor). IR light exiting the third face 320 of the dichroic cube prism 304 may be received at the IR light image sensor 308. The visible light image sensor 306 may have a light-receiving surface oriented parallel to the second face 318 of the dichroic cube prism 304, and the IR light image sensor 308 may have a light-receiving surface oriented parallel to the third face 320 of the dichroic cube prism 304.

By way of example, the dichroic surface 316 is shown to bend visible light and pass IR light. In alternative embodiments, the dichroic surface 316 may bend IR light and pass visible light, and the positions of the visible light image sensor 306 and the IR light image sensor 308 may be swapped.

In some embodiments of the imaging system 300, an IR cut filter 322 may be positioned between the second face 318 of the dichroic cube prism 304 and the visible light image sensor 306, and/or an IR bandpass filter 324 may be positioned between the third face 320 of the dichroic cube prism 304 and the IR light image sensor 308. These filters 322, 324 may block stray light that passes through the dichroic surface 316 and/or further tune the range of wavelengths that are able to impinge on the visible light image sensor 306 and/or IR light image sensor 308. In alternative embodiments, the separate filter 322 or 324 may be replaced by a respective coating on the dichroic cube prism 304 (e.g., as described with reference to FIG. 2).

In some embodiments, the imaging system 300 may include one or more lenses, filters, or other optical elements 326 positioned along the second light path 312, between the light-bending mirror 302 and the first face 314 of the dichroic cube prism 304. The lenses, filters, or other optical elements 326 may focus, filter, or otherwise process both visible and IR light. Optionally, one or more lenses, filters, or other optical elements may be positioned between the second face 318 of the dichroic cube prism 304 and the visible light image sensor 306 and be tuned for processing visible light, and/or one or more lenses, filters, or other optical elements may be positioned between the third face 320 of the dichroic cube prism 304 and the IR light image sensor 308 and be tuned for processing IR light. Optionally, one or more additional lenses, filters, or other optical elements 328 may be positioned optically upstream from the light-bending mirror 302, along the first light path 310. However, to avoid increasing a dimension of the imaging system 300 in the direction of the first light path 310, it may be desirable to minimize the number of optical elements 328, if any, positioned optically upstream from the light-bending mirror 302. In some cases, only a lens configured to expand the FoV of the imaging system 300 may be positioned optically upstream from the light-bending mirror 302.

An optional housing 330 may maintain the positions and orientations of the image sensor's components. Optionally, the visible light image sensor 306, IR light image sensor 308, or optical elements 326 may be movably mounted in relation to other components of the imaging system 300, which can enable features such as focus adjustment or image stabilization. With regard to focus adjustment, separate movement of one or both of the image sensors 306, 308 enables a common FoV to be separately focused on one or both of the image sensors 306, 308.

Figure 4A:
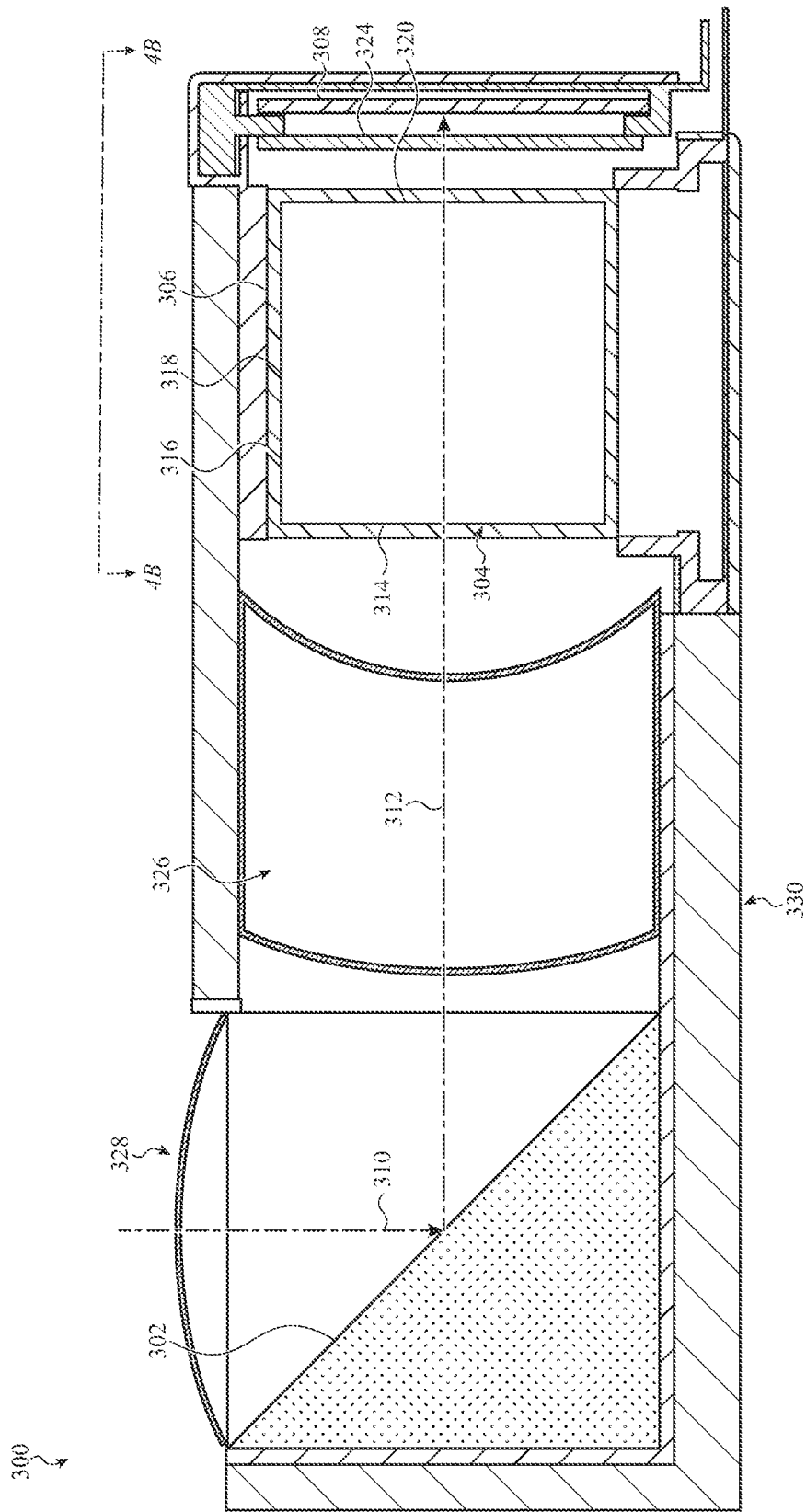
Figure 4B:
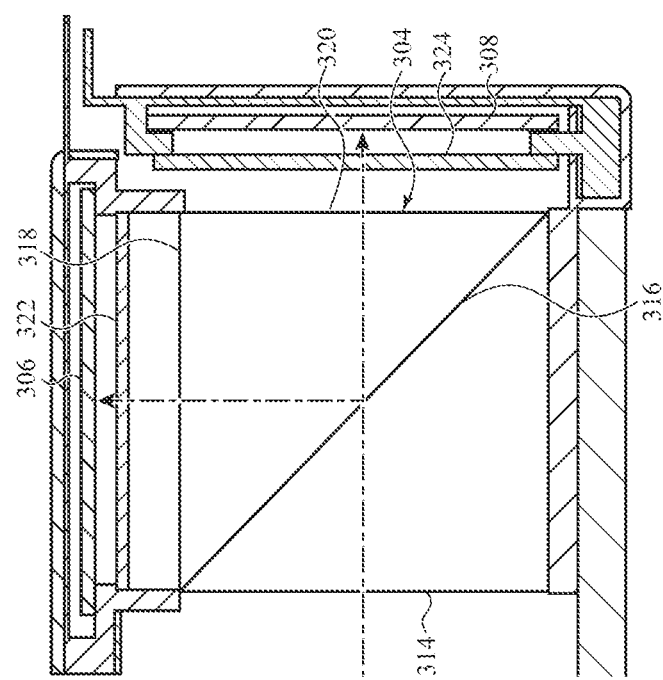

In the imaging system 300, one of the image sensors (e.g., the visible light image sensor 306) is shown to have a light-receiving surface oriented perpendicular to the first light path 310, and the other image sensor (e.g., the IR light image sensor 308) is shown to have a light-receiving surface oriented perpendicular to the second light path 312. FIGS. 4A and 4B show a variant of the imaging system described with reference to FIG. 3. The imaging system 400 includes the same light-bending mirror 302, dichroic cube prism 304, visible light image sensor 306, IR light image sensor 308, optional optical element(s) 326, optional optical element(s) 328, and optional housing 330 described with reference to FIG. 3. However, instead of the light-receiving surface of the visible light image sensor 306 being oriented perpendicular to the first light path 310, the light-receiving surface of the visible light image sensor 306 is oriented non-perpendicular to both the first light path 310 and the second light path 312.

FIG. 5 shows a fifth example of an imaging system 500 that includes a dichroic cube prism 502. In some embodiments, the imaging system 500 may be included in a mobile phone, tablet computer, laptop computer, or wearable device (e.g., an electronic watch, health monitoring device, or activity/fitness monitoring device). In some embodiments, the imaging system 500 may be included in a navigation or machine vision system, vehicle, security monitor, appliance (e.g., a doorbell), or other type of electronic device. In some embodiments, the imaging system 500 may be included in the electronic device described with reference to FIGS. 6A-6D.

The imaging system 500 includes a dichroic cube prism 502, a mirror 504, a visible light image sensor 506, and an IR light image sensor 508. The dichroic cube prism 502 may receive light, from a FoV, on a first face 510 of the dichroic cube prism 502. After entering the dichroic cube prism 502 and interacting with a dichroic surface 512 of the dichroic cube prism 502 (e.g., one or more layers sandwiched between two triangular prisms that form the cube prism), a visible light portion of the received light may be redirected through a second face 514 of the dichroic cube prism 502, and an IR light portion of the received light may be redirected through a third face 516 of the dichroic cube prism 502.

Visible light exiting the second face 514 of the dichroic cube prism 502 may be received at the visible light image sensor 506 (e.g., an RGB image sensor). IR light exiting the third face 516 of the dichroic cube prism 502 may reflect from the mirror 504, re-enter the third face 516 of the dichroic cube prism 502, interact with the dichroic surface 512, and be redirected through a fourth face 518 of the dichroic cube prism 502. The fourth face 518 may be parallel and opposite to the second face 514 of the dichroic cube prism 502. IR light exiting the fourth face 518 of the dichroic cube prism 502 may be received at the IR light image sensor 508. In some embodiments, the mirror 504 may be spaced apart from the third face 516 of the dichroic cube prism 502. In other embodiments, the mirror 504 may be formed on, or attached to, the third face 516 of the dichroic cube prism 502.

By way of example, the dichroic surface 512 is shown to initially bend visible light and pass IR light. In alternative embodiments, the dichroic surface 512 may initially bend IR light and pass visible light, and the positions of the visible light image sensor 506 and the IR light image sensor 508 may be swapped. However, bending visible light only once tends to attenuate the visible light less than the IR light. This may be beneficial in that an image output by the visible light image sensor 506 may be viewed by a person, whereas an image output by the IR light image sensor 508 may not be viewed by a person.

In some embodiments of the imaging system 500, an IR cut filter 520 may be positioned between the second face 514 of the dichroic cube prism 502 and the visible light image sensor 506, and/or an IR bandpass filter 522 may be positioned between the fourth face 518 of the dichroic cube prism 502 and the IR light image sensor 508. These filters 520, 522 may block stray light that passes through the dichroic surface 512 and/or further tune the range of wavelengths that are able to impinge on the visible light image sensor 506 and/or IR light image sensor 508. In alternative embodiments, the separate filter 520 or 522 may be replaced by a respective coating on the dichroic cube prism 502 (e.g., as described with reference to FIG. 2).

In some embodiments, the imaging system 500 may include one or more visible light lenses, filters, or other optical elements 524 (represented by a generic block of one or more optical elements) positioned between the second face 514 of the dichroic cube prism 502 and the visible light image sensor 506. The lenses, filters, or other optical elements 524 may be tuned for processing visible light. In some embodiments, the imaging system 500 may include one or more IR light lenses, filters, or other optical elements 526 (represented by a generic block of one or more optical elements) positioned between the fourth face 518 of the dichroic cube prism 502 and the IR light image sensor 508. The lenses, filters, or other optical elements 526 may be tuned for processing IR light, and may be tuned separately from the optical element(s) 524. Optionally, one or more additional lenses, filters, or other optical elements 528 may be positioned optically upstream from the dichroic cube prism 502. However, to avoid increasing the size of the imaging system 500, it may be desirable to minimize the number of optical elements 528, if any, positioned optically upstream from the dichroic cube prism 502. In some cases, only a lens configured to expand the FoV of the imaging system 500 may be positioned optically upstream from the dichroic cube prism 502.

An optional housing 530 may maintain the positions and orientations of the image sensor's components. Optionally, the visible light image sensor 506, IR light image sensor 508, or optical elements 524, 526, or 528 may be movably mounted in relation to other components of the imaging system 500, which can enable features such as focus adjustment or image stabilization. With regard to focus adjustment, separate movement of one or both of the image sensors 506, 508 enables a common FoV to be separately focused on one or both of the image sensors 506, 508.

Figure 6A:
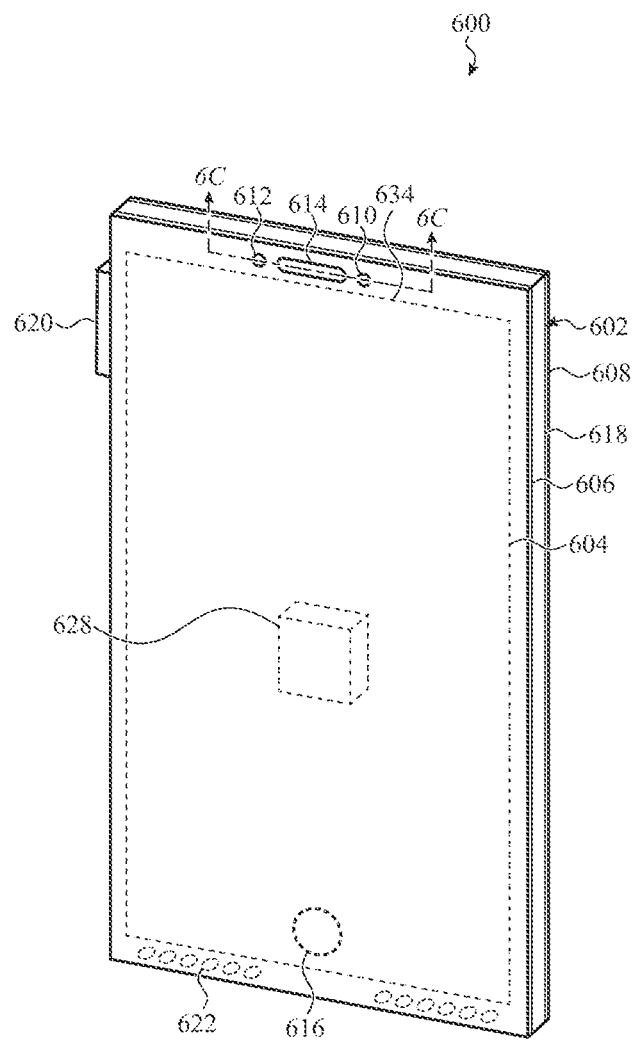
FIGS. 6A-6D show an example electronic device that includes one or more imaging systems, each of which may include a dichroic cube prism.
Figure 6B:
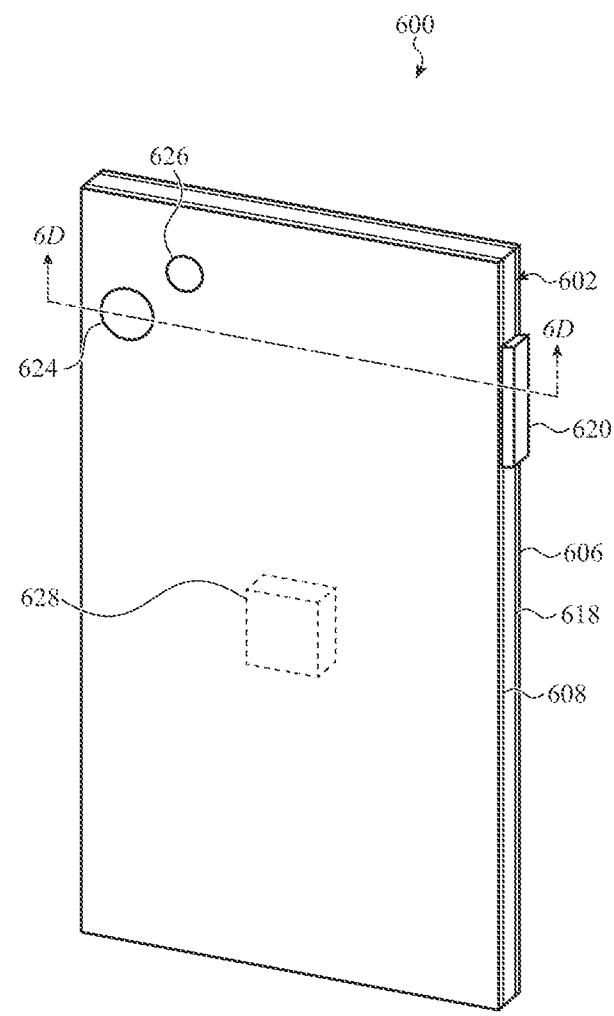

FIGS. 6A-6D show an example electronic device 600 that includes one or more imaging systems, each of which may include a dichroic cube prism as described with reference to any of FIGS. 1-5. The device's dimensions and form factor, including the ratio of the length of its long sides to the length of its short sides, suggest that the device 600 is a mobile phone (e.g., a smartphone). However, the device's dimensions and form factor are arbitrarily chosen, and the device 600 could alternatively be any portable electronic device including, for example a mobile phone, tablet computer, portable computer, portable music player, wearable device (e.g., an electronic watch, health monitoring device, or activity or fitness tracking device), augmented reality (AR) device, virtual reality (VR) device, mixed reality (MR) device, gaming device, portable terminal, digital single-lens reflex (DSLR) camera, video camera, navigation or machine vision system, vehicle, robot, or other type of portable or mobile electronic device. The device 600 could also be a device that is semi-permanently located (or installed) at a single location, such as a security monitor or appliance (e.g., a doorbell). FIG. 6A shows a front isometric view of the device 600, and FIG. 6B shows a rear isometric view of the device 600.

The device 600 may include a housing 602 that at least partially surrounds a display 604. The housing 602 may include or support a front cover 606 and/or a back cover 608 (e.g., a front cover 606 opposite a back cover 608). The front cover 606 may be positioned over the display 604 and provide a window through which the display 604 may be viewed. In some embodiments, the display 604 may be attached to (or abut) the housing 602 and/or the front cover 606. In alternative embodiments of the device 600, the display 604 may not be included and/or the housing 602 may have an alternative configuration.

The display 604 may include one or more light-emitting elements, and in some cases may be a light-emitting diode (LED) display, an organic LED (OLED) display, a liquid crystal display (LCD), an electroluminescent (EL) display, or another type of display. In some embodiments, the display 604 may include, or be associated with, one or more touch and/or force sensors that are configured to detect a touch and/or a force applied to a surface of the front cover 606.

The various components of the housing 602 may be formed from the same or different materials. For example, a sidewall 618 of the housing 602 may be formed using one or more metals (e.g., stainless steel), polymers (e.g., plastics), ceramics, or composites (e.g., carbon fiber). In some cases, the sidewall 618 may be a multi-segment sidewall including a set of antennas. The antennas may form structural components of the sidewall 618. The antennas may be structurally coupled (to one another or to other components) and electrically isolated (from each other or from other components) by one or more non-conductive segments of the sidewall 618. The front cover 606 may be formed, for example, using one or more of glass, a crystal (e.g., sapphire), or a transparent polymer (e.g., plastic) that enables a user to view the display 604 through the front cover 606. In some cases, a portion of the front cover 606 (e.g., a perimeter portion of the front cover 606) may be coated with an opaque ink to obscure components included within the housing 602. The back cover 608 may be formed using the same material(s) that are used to form the sidewall 618 or the front cover 606. In some cases, the back cover 608 may be part of a monolithic element that also forms the sidewall 618 (or in cases where the sidewall 618 is a multi-segment sidewall, those portions of the sidewall 618 that are conductive or non-conductive). In still other embodiments, all of the exterior components of the housing 602 may be formed from a transparent material, and components within the device 600 may or may not be obscured by an opaque ink or opaque structure within the housing 602.

The front cover 606 may be mounted to the sidewall 618 to cover an opening defined by the sidewall 618 (i.e., an opening into an interior volume in which various electronic components of the device 600, including the display 604, may be positioned). The front cover 606 may be mounted to the sidewall 618 using fasteners, adhesives, seals, gaskets, or other components.

A display stack or device stack (hereafter referred to as a "stack") including the display 604 may be attached (or abutted) to an interior surface of the front cover 606 and extend into the interior volume of the device 600. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 606 (e.g., to a display surface of the device 600).

In some cases, a force sensor (or part of a force sensor system) may be positioned within the interior volume above, below, and/or to the side of the display 604 (and in some cases within the device stack). The force sensor (or force sensor system) may be triggered in response to the touch sensor detecting one or more touches on the front cover 606 (or a location or locations of one or more touches on the front cover 606), and may determine an amount of force associated with each touch, or an amount of force associated with a collection of touches as a whole. In some embodiments, the force sensor (or force sensor system) may be used to determine a location of a touch, or a location of a touch in combination with an amount of force of the touch. In these latter embodiments, the device 600 may not include a separate touch sensor.

As shown primarily in FIG. 6A, the device 600 may include various other components. For example, the front of the device 600 may include one or more front-facing cameras 610 (including one or more image sensors), light sources 612, speakers 614, microphones, or other components (e.g., audio, imaging, and/or sensing components) that are configured to transmit or receive signals to/from the device 600. In some cases, the front-facing cameras 610, alone or in combination with other sensors or components (e.g., the light sources 612), may be configured to operate as a front-facing photography camera and an IR bio-authentication or facial recognition sensor. The device 600 may also include various input devices, including a mechanical or virtual button 616, which may be accessible from the front surface (or display surface) of the device 600.

The device 600 may also include buttons or other input devices positioned along the sidewall 618 and/or on a rear surface of the device 600. For example, a volume button or multipurpose button 620 may be positioned along the sidewall 618, and in some cases may extend through an aperture in the sidewall 618. The sidewall 618 may include one or more ports 622 that allow air, but not liquids, to flow into and out of the device 600. In some embodiments, one or more sensors may be positioned in or near the port(s) 622. For example, an ambient pressure sensor, ambient temperature sensor, internal/external differential pressure sensor, gas sensor, particulate matter concentration sensor, or air quality sensor may be positioned in or near a port 622.

In some embodiments, the rear surface of the device 600 may include one or more rear-facing cameras 624 (including one or more image sensors; see FIG. 6B). A flash or light source 626 may also be positioned on the rear of the device 600 (e.g., near the rear-facing camera(s)). In some cases, the rear-facing camera(s) may include a rear-facing photography camera and an IR depth sensor.

The device 600 may include a processor or controller 628 for performing various functions, including, for example, communication, sensing, imaging, location-finding, charging, powering, or processing functions. In some embodiments, the processor or controller 628 may be configured to operate a visible light image sensor and an IR light image sensor (of the front-facing cameras 610 or, alternatively, the rear-facing cameras 624) in parallel, for simultaneous acquisition of a visible light image and an IR light image. In some embodiments, the processor or controller 628 may use the IR light image to adjust characteristics of the visible light image. In some embodiments, the processor or controller 628 may use the visible and IR light images for different purposes (e.g., photography (visible light image) versus bio-authentication or facial recognition (IR light image)).

In some embodiments, the processor or controller 628 may be configured to operate a visible light image sensor and an IR light image sensor (of the front-facing cameras 610 or, alternatively, the rear-facing cameras 624) sequentially, for sequential acquisition of a visible light image and an IR light image.

In some embodiments, the processor or controller 628 may operate a light source and cause the light source to illuminate at least part of a FoV of an image sensor while the image sensor is operated to acquire an image. When a visible light image is acquired, and in some embodiments, a flood or flash visible light source may be caused to illuminate at least part of the FoV. When an IR light image is acquired, and in some embodiments, a flood or structured IR light source may be caused to illuminate at least part of the FoV.

In some embodiments of the device 600, the imaging system described with reference to any of FIGS. 1-5 may be used for the front-facing cameras 610 and/or the rear-facing cameras 624, with the various faces of the imaging system's dichroic cube prism being oriented parallel or perpendicular to the front and back covers 606, 608.

Regardless of whether an imaging system including a dichroic cube prism is used for the front-facing cameras 610 or the rear-facing cameras, the imaging system's components (e.g., its dichroic cube prism, mirrors, filters, and image sensors) may be positioned between the front and back covers 606, 608, and the imaging system may receive light through one of the front cover 606 or the back cover 608. With any of the imaging systems, at least a portion of the light received by the imaging system may be bent (or folded) and redirected parallel to and between the front and back covers 606, 608. In the case of the imaging system described with reference to FIG. 3 or 4, and substantially so in the imaging system described with reference to FIG. 5, all of the light received by the imaging system may be bent (or folded) and redirected parallel to and between the front and back covers 606, 608.

Figure 6C:
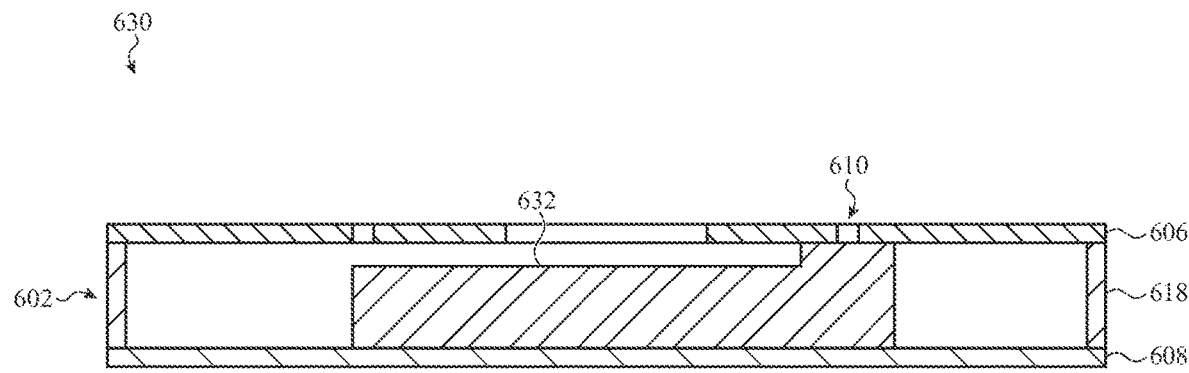

FIG. 6C shows a first example cross-section 630 of the device 600 shown in FIGS. 6A and 6B, taken along cut line 6C-6C. The cross-section 630 shows an example use of one of the imaging systems described with reference to FIGS. 1-5 to provide the front-facing cameras 610. As shown, at least some of the components of the imaging system 632 may be laterally offset from an edge 634 of the display 604. In some embodiments, all of the components of the imaging system 632 may be laterally offset from the edge 634 of the display 604. In other embodiments, some of the components of the imaging system 632 may be positioned between the display 604 and the back cover 608 (e.g., in the case of an imaging system that bends or folds light and redirects light along a light path that is parallel to the front and back covers 606, 608).

Figure 6D:
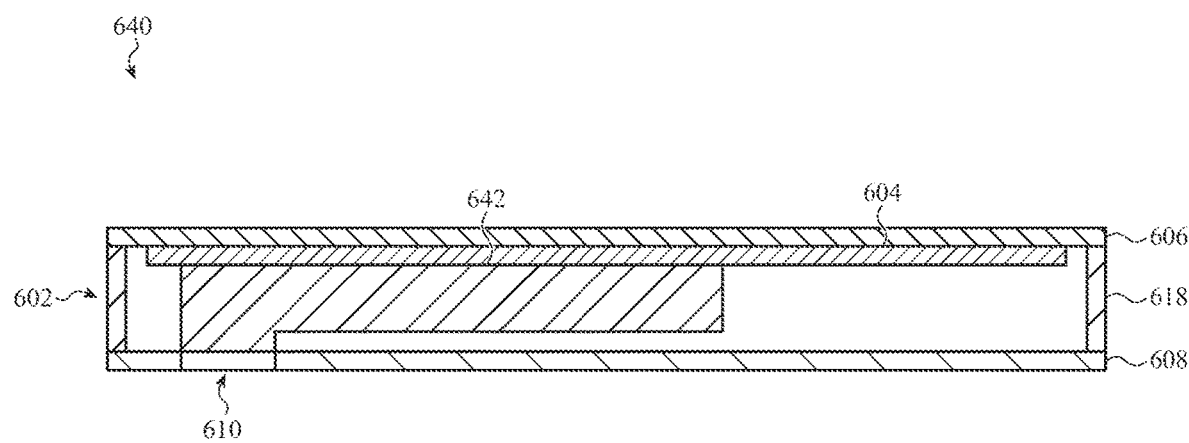

FIG. 6D shows a second example cross-section 640 of the device 600 shown in FIGS. 6A and 6B, taken along cut line 6D-6D. The cross-section 640 shows an example use of one of the imaging systems described with reference to FIGS. 1-5 to provide the rear-facing cameras 624. As shown, at least some of the components of the imaging system 642 may be positioned between the display 604 and the back cover 608. In some embodiments, all of the components of the imaging system 642 may be positioned between the display 604 and the back cover 608. In other embodiments, some of the components of the imaging system 642 may be positioned (or extend to) adjacent the display 604.

Figure 7:
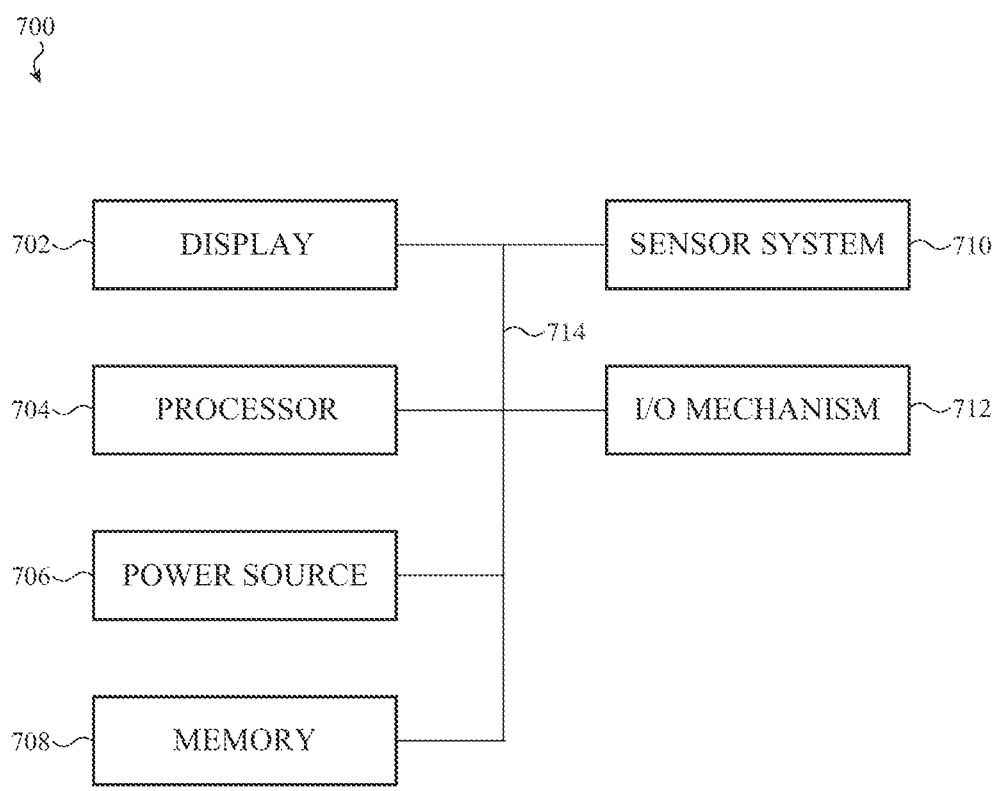
FIG. 7 shows an example electrical block diagram of an electronic device.

FIG. 7 shows an example electrical block diagram of an electronic device 700 that includes one or more imaging systems, such as one or more of the imaging systems described with reference to FIGS. 1-6D. The electronic device 700 may take forms such as a hand-held or portable device (e.g., a smartphone, tablet computer, or electronic watch), a navigation system of a vehicle, and so on. The electronic device 700 may include an optional display 702 (e.g., a light-emitting display), a processor 704, a power source 706, a memory 708 or storage device, a sensor system 710, and an optional input/output (I/O) mechanism 712 (e.g., an input/output device and/or input/output port). The processor 704 may control some or all of the operations of the electronic device 700. The processor 704 may communicate, either directly or indirectly, with substantially all of the components of the electronic device 700. For example, a system bus or other communication mechanism 714 may provide communication between the processor 704, the power source 706, the memory 708, the sensor system 710, and/or the input/output mechanism 712.

The processor 704 may be implemented as any electronic device capable of processing, receiving, or transmitting data or instructions. For example, the processor 704 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments, the components of the electronic device 700 may be controlled by multiple processors. For example, select components of the electronic device 700 may be controlled by a first processor and other components of the electronic device 700 may be controlled by a second processor, where the first and second processors may or may not be in communication with each other.

The power source 706 may be implemented with any device capable of providing energy to the electronic device 700. For example, the power source 706 may include one or more disposable or rechargeable batteries. Additionally or alternatively, the power source 706 may include a power connector or power cord that connects the electronic device 700 to another power source, such as a wall outlet.

The memory 708 may store electronic data that may be used by the electronic device 700. For example, the memory 708 may store electrical data or content such as, for example, audio and video files, documents and applications, device settings and user preferences, timing signals, control signals, data structures or databases, image data, maps, or focus settings. The memory 708 may be configured as any type of memory. By way of example only, the memory 708 may be implemented as random access memory, read-only memory, Flash memory, removable memory, other types of storage elements, or combinations of such devices.

The electronic device 700 may also include one or more sensors defining the sensor system 710. The sensors may be positioned substantially anywhere on the electronic device 700. The sensor(s) may be configured to sense substantially any type of characteristic, such as but not limited to, touch, force, pressure, electromagnetic radiation (e.g., light), heat, movement, relative motion, biometric data, distance, and so on. For example, the sensor system 710 may include a touch sensor, a force sensor, a heat sensor, a position sensor, a light or optical sensor, an accelerometer, a pressure sensor (e.g., a pressure transducer), a gyroscope, a magnetometer, a health monitoring sensor, an image sensor, and so on. Additionally, the one or more sensors may utilize any suitable sensing technology, including, but not limited to, capacitive, ultrasonic, resistive, optical, ultrasound, piezoelectric, and thermal sensing technology.

The I/O mechanism 712 may transmit and/or receive data from a user or another electronic device. An I/O device may include a display, a touch sensing input surface such as a track pad, one or more buttons (e.g., a graphical user interface "home" button, or one of the buttons described herein), one or more cameras (including one or more image sensors), one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 712 may also provide feedback (e.g., a haptic output) to a user.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources. The present disclosure contemplates that, in some instances, this gathered data may include personal information data (e.g., biological information) that uniquely identifies or can be used to identify, locate, contact, or diagnose a specific person. Such personal information data can include demographic data, location-based data, telephone numbers, email addresses, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to activate or deactivate various functions of the user's device, or gather performance metrics for the user's device or the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States (US), collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users may selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
a housing including a front cover opposite a back cover;
a display viewable through the front cover;
a light-bending mirror positioned between the front cover and the back cover and receiving light through one of the front cover or the back cover, the light-bending mirror redirecting the received light along a light path parallel to the front cover and the back cover;
a dichroic cube prism positioned in the light path, the dichroic cube prism receiving light through a first face of the dichroic cube prism, redirecting a visible light portion of the received light through a second face of the dichroic cube prism, and redirecting an infrared (IR) portion of the received light through a third face of the dichroic cube prism;
a visible light image sensor positioned to receive visible light exiting the second face of the dichroic cube prism; and
an IR light image sensor positioned to receive IR light exiting the third face of the dichroic cube prism.

2. The electronic device of claim 1, wherein:
the second face of the dichroic cube prism is perpendicular to the front cover and the back cover; and
the third face of the dichroic cube prism is perpendicular to the front cover and the back cover.

3. The electronic device of claim 1, wherein:
the second face of the dichroic cube prism is perpendicular to the front cover and the back cover; and
the third face of the dichroic cube prism is parallel to the front cover and the back cover.

4. The electronic device of claim 1, wherein the light-bending mirror is laterally offset from an edge of the display.

5. The electronic device of claim 1, wherein:
the light-bending mirror is positioned between the display and the back cover; and
the light-bending mirror receives the light through the back cover.

6. The electronic device of claim 1, further comprising:
a controller configured to operate the visible light image sensor and the IR light image sensor in parallel, for simultaneous acquisition of a visible light image and an IR light image.

7. The electronic device of claim 1, further comprising:
an IR light source; and
a controller configured to,
operate the visible light image sensor and the IR light image sensor sequentially, for sequential acquisition of a visible light image and an IR light image; and
cause the IR light source to illuminate at least part of a field of view of the IR light image sensor while the IR light image sensor is operated to acquire the IR light image.

8. The electronic device of claim 1, further comprising:
an IR cut filter coating on the second face of the dichroic cube prism; and
an IR bandpass filter coating on the third face of the dichroic cube prism.

9. The electronic device of claim 8, further comprising:
a light-blocking material extending from the dichroic cube prism to between the visible light image sensor and the IR light image sensor.

10. An electronic device, comprising:
a dichroic cube prism receiving light through a first face of the dichroic cube prism, redirecting a visible light portion of the received light through a second face of the dichroic cube prism, and redirecting an infrared (IR) portion of the received light through a third face of the dichroic cube prism;
a visible light image sensor positioned to receive visible light exiting the second face of the dichroic cube prism;
a mirror positioned to reflect IR light exiting the third face of the dichroic cube prism back into the third face of the dichroic cube prism, the dichroic cube prism redirecting the reflected IR light through a fourth face of the dichroic cube prism; and
an IR light image sensor positioned to receive the IR light exiting the fourth face of the dichroic cube prism.

11. The electronic device of claim 10, further comprising:
a set of one or more visible light lenses, filters, or other optical elements positioned between the second face of the dichroic cube prism and the visible light image sensor.

12. The electronic device of claim 11, further comprising:
a set of one or more IR light lenses, filters, or other optical elements positioned between the fourth face of the dichroic cube prism and the IR light image sensor.

13. The electronic device of claim 10, wherein the second face of the dichroic cube prism is parallel to the fourth face of the dichroic cube prism.

14. The electronic device of claim 10, further comprising:
a housing including a front cover opposite a back cover; and
a display viewable through the front cover; wherein,
the dichroic cube prism is positioned between the front cover and the back cover and receives light through one of the front cover or the back cover; and
the second face of the dichroic cube prism and the fourth face of the dichroic cube prism are perpendicular to the front cover.

15. The electronic device of claim 10, further comprising:
a controller configured to operate the visible light image sensor and the IR light image sensor in parallel, for simultaneous acquisition of a visible light image and an IR light image.

16. The electronic device of claim 10, further comprising:
an IR light source; and
a controller configured to,
  operate the visible light image sensor and the IR light image sensor sequentially, for sequential acquisition of a visible light image and an IR light image; and
  cause the IR light source to illuminate at least part of a field of view of the IR light image sensor while the IR light image sensor is operated to acquire the IR light image.

17. The electronic device of claim 10, further comprising:
an IR cut filter positioned between the second face of the dichroic cube prism and the visible light image sensor; and
an IR bandpass filter positioned between the fourth face of the dichroic cube prism and the IR light image sensor.

18. The electronic device of claim 10, wherein the dichroic cube prism is laterally offset from an edge of a display.

19. An imaging system, comprising:
a dichroic cube prism receiving light through a first face of the dichroic cube prism, redirecting a visible light portion of the received light through a second face of the dichroic cube prism, and redirecting an infrared (IR) portion of the received light through a third face of the dichroic cube prism;
an IR cut filter coating on the second face;
an IR bandpass filter coating on the third face;
a visible light image sensor positioned to receive visible light exiting the second face of the dichroic cube prism and passing through an IR cut filter; an IR light image sensor positioned to receive IR light exiting the third face and passing through an IR bandpass filter; and
a light-blocking material extending from the dichroic cube prism and to between the visible light image sensor and the IR light image sensor.

* * * * *